June 5, 1951

C. M. O'LEARY 2,555,454

PLANETARY GEARING

Filed Oct. 16, 1948

INVENTOR.
Charles M. O'Leary.
BY
Harness, Dickey & Pierce.
ATTORNEYS.

June 5, 1951  C. M. O'LEARY  2,555,454
PLANETARY GEARING
Filed Oct. 16, 1948  2 Sheets-Sheet 2
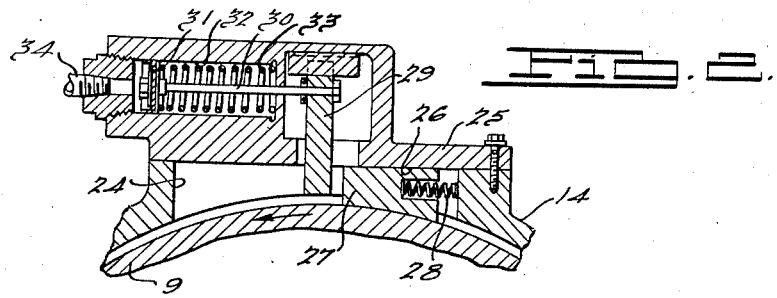
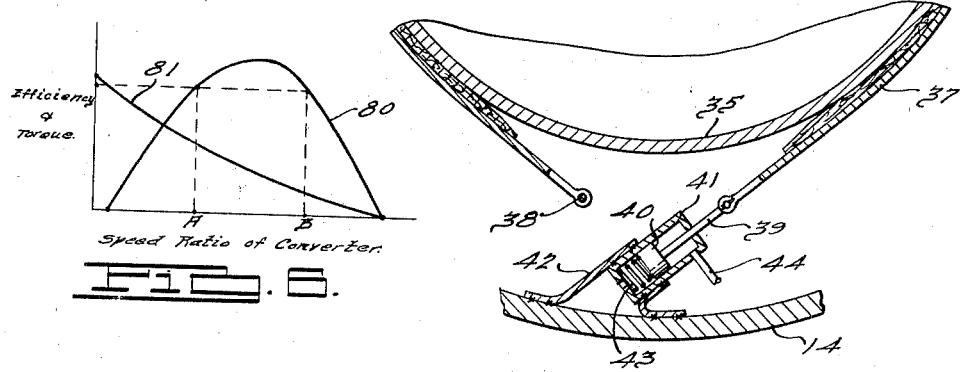
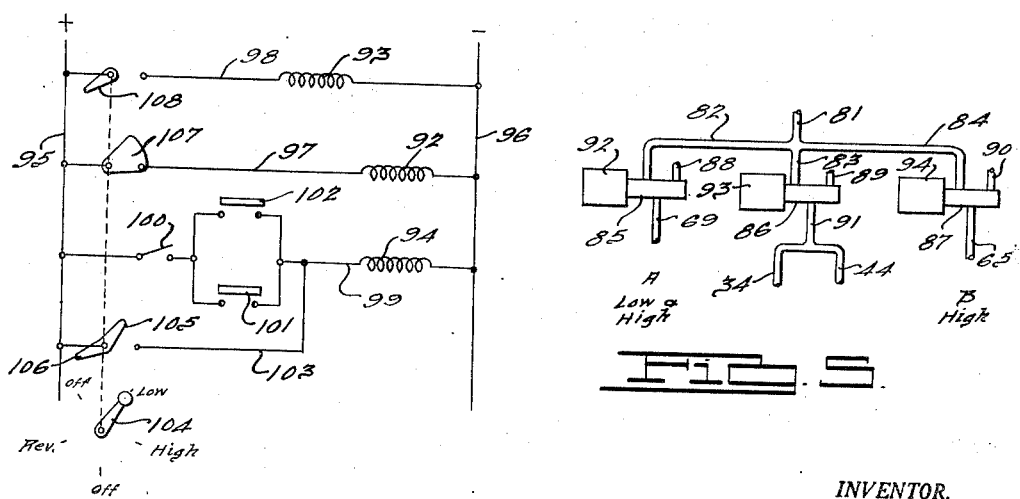
INVENTOR.
Charles M. O'Leary.
BY
Harness, Dickey & Pierce
ATTORNEYS.

Patented June 5, 1951

2,555,454

UNITED STATES PATENT OFFICE 2,555,454

PLANETARY GEARING

Charles M. O'Leary, Balboa Island, Calif.

Application October 16, 1948, Serial No. 54,983

1 Claim. (Cl. 74—762)

The present invention relates to a power transmission system particularly designed for use in driving the rotary table of a rotary well drilling machine from an independent power source.

It is the general object of the present invention to provide a compact independent drive connection between a source of power, such as an internal combustion engine, and the rotary table of a well drilling machine incorporating an improved two-speed and reverse transmission mechanism of exceptional ruggedness and durability.

Another object of the invention is to provide a drive connection of the type mentioned including a hydrokinetic torque converter for automatically varying the speed and torque ratios in accordance with variations in the load.

Other objects and advantages of the invention will become apparent from the following specification, the accompanying drawings and the appended claim.

In the drawings:

Figure 2 is a fragmentary section taken on the line 2—2 of Figure 1;

Figure 3 is a fragmentary section taken on the line 3—3 of Figure 1;

Figure 4 is a wiring diagram suitable for use in controlling the transmission;

Figure 5 is a diagrammatic view of the pneumatic control valves employed for controlling the speed ratios of the transmission; and Figure 6 is a diagram showing representative efficiency and torque curves for hydrokinetic torque converters plotted against speed ratio.

Figure 1:
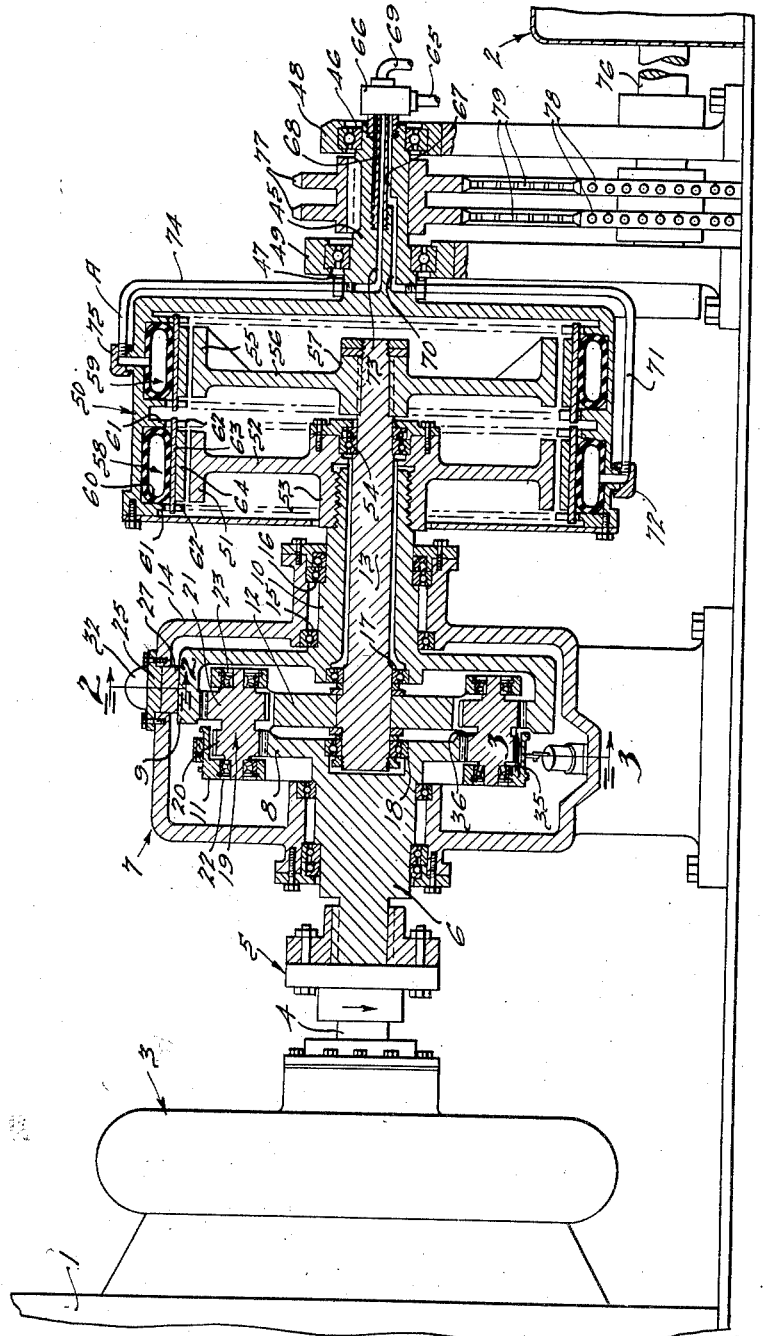
Figure 1 is a longitudinal sectional view of the improved transmission.

Referring to the drawings, the invention comprises a power transmitting transmission adapted to connect the engine or other suitable source of power 1 with a conventional rotary table 2 of the type employed to rotate the drill stem in a rotary drilling machine. The transmission preferably includes a hydrokinetic torque converter, indicated generally at 3, the input shaft of which is connected to the engine crankshaft. The hydrokinetic torque converter is of the type employing a vaned impeller connected to the power input shaft, a vaned rotor or turbine connected to the power output shaft 4, and stationary reaction vanes so constructed that the speed of the output shaft for a given input speed will vary more or less inversely as the torque load and the mechanical advantage or torque multiplication provided by the converter will vary inversely with respect to the output speed. Since hydrokinetic torque converters of the type mentioned are well known and since any suitable or conventional design of converter may be employed, details of construction need not be illustrated or described herein. Typical examples of torque converters are disclosed in United States Patents Nos. 1,199,359 and 2,102,635.

The output shaft 4 of the converter is connected by a flanged coupling 5, of suitable construction, to the power input shaft 6 of a planetary transmission, indicated generally at 7. Transmission 7 includes a sun gear 8 fixed to the power intake shaft 6, a ring gear 9 fixed to a tubular power output shaft 10, and a planet cage 11 having an inwardly directed flange 12 fixed to a power output shaft 13. The tubular shaft 10 is supported in a suitable housing 14 by means of bearings 15 and 16, and the shaft 13 is journaled by means of bearings 17 and 18 in the tubular shaft 10 and a recess formed in the right-hand end of the power input shaft 6, respectively. The planet cage 11 carries a plurality of planet gear clusters 19, each of which includes a gear 20 in mesh with the sun gear 8 and a slightly larger gear 21 in mesh with the ring gear 9. The planet gear clusters are supported and journaled in the cage by means of bearings 22 and 23.

As a result of this arrangement, if the ring gear 9 is held stationary, the output shaft 13 will be rotated forwardly at reduced speed as compared with the input shaft 6; while if the planet cage 11 is held stationary, the tubular output shaft 10 will be rotated in reverse at reduced speed as compared with the speed of the shaft 6. In addition, when shafts 10 and 13 are fixed together, they will both rotate at the speed of input shaft 6. Suitable means, hereinafter described in greater detail, are provided for thus controlling the operation of the transmission, with the result that the transmission can operate at two different speed ratios forward and one in reverse.

When the transmission is delivering power from shaft 6 to shaft 13, the load on the ring gear 9 tends to rotate the ring gear in a direction opposite to that of shaft 6. In order to achieve the lower forward speed ratio, means are provided for preventing such reverse rotation of the ring gear. This means comprises a plurality, preferably three, of one-way friction clutches or brake blocks which are equally spaced circumferentially around the periphery of the ring gear. The construction of all of these clutch blocks and their associated control mechanisms is the same and, consequently, a description of one will suffice.

As best shown in Figure 2, the housing 14 is provided with an opening 24 having a removable closure plate 25 having a flat inner surface 26. A tapered clutch or brake block 27 is fitted between the inner surface 26 of the plate 25 and the outer periphery of the ring gear 9. This block is somewhat wedge-shaped and is so positioned that counterclockwise rotation of the ring gear, as viewed in Figure 2, will tend to wedge the block between the ring gear and the plate 25 and thus apply a braking force to the gear. A spring 28 normally urges the brake block 27 into operative or braking position. As a result of this arrangement, the brake block normally automatically prevents reverse rotation of the ring gear 9 but will not interfere with forward rotation, since rotation of the ring gear in a forward direction, that is the same direction as the rotation of shaft 6, will tend to force the block 27 to the right, as viewed in Figure 2, and release the brake.

Means are provided in connection with each of the brake blocks 27 for shifting them into an inoperative position. This means comprises a downwardly projecting finger 29, the upper end of which is carried by the rod 30 of a piston 31, the latter being positioned within a cylinder 32 cast integrally with the plate 25. A spring 33 normally holds the piston 31 at the right-hand end of the cylinder 32, as shown in Figure 2, and thus holds the finger 29 out of engagement with the block 27. When it is desired to render the brake block 27 inoperative, air under pressure is admitted through a pipe 34 associated with the left-hand end of the cylinder 32. This shifts the piston, finger 29 and the brake block 27 to the right, as viewed in Figure 2, and thus renders the mechanism inoperative. Under these circumstances, the ring gear 9 is free to rotate in reverse.

When it is desired to effect reverse rotation of the ring gear 9, it is necessary to hold the planet cage 11 stationary. This is accomplished by applying the band brake to the planet cage. Thus, as best shown in Figures 1 and 3, the planet cage includes a cylindrical axially directed portion 35 which surrounds the smaller gears 20 of the planet gear clusters and forms a brake drum. The brake drum 35 and the housings for the planet gear bearings 22 and 23 are integrally connected together and to the integrally directed flange 12 of the cage by a plurality of webs 36, which are positioned between the planet gear clusters and extend generally parallel to the axis of the transmission.

As best shown in Figure 3, the brake drum 35 is provided with a band brake 37 anchored at one end to the housing 14 by means of a pin 38 and connected at the other end to a piston rod 39 of a piston 40, which is positioned within a cylinder 41. Cylinder 41 is fixed to the casing 14 by a suitable bracket 42. A spring 43, positioned within the cylinder, normally urges the piston 40 in a direction to release the brake band 37 from the drum 35. When it is desired to apply the brake band and thus hold the planet cage against rotation, air under pressure is admitted through a pipe 44 to the cylinder 41.

As a result of the above described construction, it will be apparent that the transmission 7 automatically rotates shaft 13 in low gear ratio when no air is admitted to either of the pipes 34 or 44, and that it rotates shaft 10 in reverse if air is admitted to both of the pipes 34 and 44. It will also be apparent that if the shafts 10 and 13 are connected together and no air is admitted to either of the pipes 34 or 44, both of the shafts 10 and 13 will rotate at the same speed as the shaft 6, thus providing the high speed ratio of the transmission. Thus, under some circumstances power is delivered by the shaft 10; under others, power is delivered by the shaft 13. In addition, for the high speed ratio, power may be delivered by either of the shafts 10 or 13, provided they are connected together.

A novel arrangement of clutches is provided for connecting either of the shafts 10 or 13 to a power take-off shaft and for connecting the two shafts 10 and 13 together. Thus, as shown in Figure 1, a power take-off shaft 45 is journaled in alignment with the axes of the shafts 10 and 13 by means of bearings 46 and 47 mounted in bearing pedestals 48 and 49, respectively. The power take-off shaft has fixed thereto an enlarged cylindrical housing, indicated generally at 50, which surrounds the extremities of the shafts 10 and 13. Within the housing 50 is positioned a cylindrical drum 51 which is connected by a web 52 in a threaded hub 53 to the outer extremity of the tubular shaft 10. The hub 53 also supports a bearing 54 for the shaft 13. A similar cylindrical drum 55 positioned within the drum 50 is connected by means of a web 56 and a hub 57 to the extremity of the shaft 13. The drum 50 is adapted to be connected independently to either or both of the drums 51 and 55 by a pair of friction clutches, indicated generally at 58 and 59, of the type which consists in an annular inflatable flexible tube which is positioned between the respective drums and is adapted when inflated to urge a friction band carried by one of the drums into frictional engagement with the other drum. The clutch 58, shown in Figure 1, comprises an annular flexible tubular member 60 formed of any suitable airtight flexible material, such as rubber or cloth impregnated rubber. The tube 60 is positioned within an annular recess formed by a pair of inwardly directed flanges or webs 61 which are readily slotted at a plurality of points around their inner periphery, as indicated at 62. A plurality of circumferentially aligned sheet metal plates 63 engage the inner surface of the tube 60 and are provided with projections which extend into the slots 62 in order to prevent circumferential movement of the plates 63 relative to the housing 50. A block of friction material 64 is secured to each of the plates 63 and is adapted to engage the outer periphery of the drum 51 when the tube 60 is inflated by a fluid under pressure. Clutch 59 is of similar construction and hence need not be further described.

It will be apparent from the above that when air is admitted to either of the clutches 58 or 59, the drum 50 will be connected to the associated drum 51 or 55 and that, moreover, when both of the clutches 58 and 59 are engaged, shafts 10 and 13 will be connected together to effect the high speed ratio of the transmission.

Air or other fluid under pressure may be admitted to the clutch 58 through pipe 65, which communicates through a suitable fitting 66 with the annular space between the walls of an axial bore 67 formed in the power take-off shaft 45, and a tube 68 which extends through the fitting 66 and connects to an external pipe 69. The space between the tube 68 and the bore 67 within which it is positioned is connected by a passageway 70 and a pipe 71 to a fitting 72 associated with the tubular member 60 of clutch 58. Accordingly, when fluid under pressure is admitted to pipe 65, it will be delivered to the tube 60 and effect engagement of the clutch 58. When fluid under pressure is admitted to the pipe 69, it passes through the tube 68, a passageway 73, pipe 74 and a fitting 75 to the interior of the tube associated with the clutch 59 and thus effects engagement of the latter.

The power take-off shaft 45 is connected to the power input shaft 76 of a conventional rotary table of the type employed in oil well drilling operations by means of a pair of sprockets 77 fixed to the shaft 45, similar sprockets 78 fixed to the shaft 76 and connecting drive chains 79. The rotary table drive shaft 76 is suitably extended for this purpose and journaled at its outer ends in bearings provided in the lower portion of the pedestals 48 and 49.

The relative sizes of the gears in the transmission 7 are so selected that the relation between the high and low speed ratios of the transmission are so correlated with the efficiency-speed ratio curve of the torque converter 3 that the combined torque converter and transmission will provide a wide range of torque and speed multiplication ratios within the high efficiency range of operation of the torque converted. Hydrokinetic torque converters have an efficiency curve which, when plotted against the ratio of the input speed of the converter to the output speed, assumes a form similar to that illustrated in Figure 6 by the line 80. The torque ratio for a typical hydrokinetic torque converter is represented by the line 81 in the same figure. It will be apparent that the efficiency of the converter at low and high speed ratios drops off to zero. Consequently, it is highly desirable to maintain the speed ratio of the converter during normal operation within the intermediate range of high efficiency.

In the particular torque converter whose performance is represented by the curve shown in Figure 6, it will be apparent that there is a range of speed ratios from A to B in which the efficiency is high and that the speed ratio at B is approximately twice the speed ratio at A. It will be further noted that at the speed ratios A and B, the efficiency of the torque converter is the same. Consequently, if the transmission is operating in low gear and the speed ratio of the converter is B in Figure 6, the speed ratio of the converter could be reduced to the radio A by doubling the transmission ratio. This would be desirable if the load were tending to fall off, since it would then permit the converter to further increase its speed ratio in the efficient range. Conversely, if the transmission were in its high ratio and the torque converter were operating at the speed ratio A, a reduction in the speed ratio of the transmission to half its former value would increase the speed ratio of the torque converter to the ratio B. This would be desirable if the load were tending to increase, since it would permit the speed ratio of the converter to decrease within its range of maximum efficiency. Accordingly, the transmission 7 is so designed that the two forward speed ratios bear the same relation to each other as the speed ratios A and B of the torque converter employed. The ratios A and B, for design purposes, are chosen as points of relatively high efficiency on opposite sides of the speed ratio of peak efficiency and are speed ratios at which the efficiency of the converter is the same. For a torque converter having a curve of the form shown in Figure 6, the ratio between the speed ratios A and B is 2–1. Consequently, the transmission 7 is such a case could have a low speed ratio of 2–1 and a high speed ratio of 1–1.

Any suitable means may be provided for supplying air under pressure to the pipes 34, 44, 65 and 69. Preferably, however, the means for this purpose comprises a source of air under pressure and a system of solenoid controlled three-way air valves arranged in the manner shown in Figure 5. As there shown, a pipe 81, which is connected to any suitable source of air under pressure, delivers air through branch pipes 82, 83 and 84 to three-way solenoid operated valves 85, 86 and 87, respectively. These valves are of the type which normally connect atmospheric ports, indicated diagrammatically at 88, 89 and 90, to valve outlet lines 69, 91 and 65. Under these conditions, the branch lines 82, 83 and 84 are blocked by the valves. However, each valve has associated therewith a solenoid, the three solenoids being indicated, respectively, by the numerals 92, 93 and 94. Energization of any one of the solenoids shifts the valve spool in a direction to connect the branch pressure supply line to the outlet line of the valve and blocks the atmospheric port of the valve. Thus, energization of the solenoid 92 connects line 82 to line 69, thereby supplying air under pressure to the clutch 59. Energization of the solenoid 93 connects the pressure supply line 83 to the line 91, which, in turn, is connected to branch lines 34 and 44 associated, respectively, with the one-way clutch blocks 27 and the brake band 37. Energization of solenoid 94 supplies air under pressure from line 84 to line 65, thus engaging the clutch 58.

A suitable form of electrical control circuit for energizing the solenoids 92, 93 and 94 in proper sequence is illustrated diagrammatically in Figure 4. As there shown, the circuit includes a pair of supply lines 95 and 96 across which are connected the solenoids 92, 93 and 94 by lines 97, 98 and 99, respectively. Line 99 includes a normally open switch 100 and switches 101 and 102, hereinafter described in greater detail, connected in parallel with each other and in series with the switch 100. A branch line 103 is also connected between the supply line 95 and the left-hand end of the solenoid 94 in parallel with switches 100, 101 and 102. A multiple pole switch having a rotatable operating lever, indicated diagrammatically at 104, is provided with three rotary blade contacts located, respectively, in the lines 103, 97 and 98 and operatively connected to lever 104. The contact in line 103 is a double contact 105 and 106; contacts 107 and 108 are in lines 97 and 98, respectively. The switch operating lever 104 may be rotated into any one of five positions, but is shown in the low gear position in which the contact 107 is closed while the contacts 105 and 108 are open. When the lever 104 is shifted downwardly from the position shown, contact 105 closes, thereby energizing solenoid 94 while contact 107 remains closed. This places the transmission in high gear by engaging both of the clutches 58 and 59. When handle 104 is shifted to either of the two off positions indicated in Figure 4, none of the solenoids is energized and, therefore, the transmission is disconnected from shaft 45. When the handle 104 is shifted to reverse position, contacts 106 and 108 close, energizing solenoids 93 and 94 and thereby establishing the reverse gear drive.

It will be observed that in the operation of the mechanism so far described, switch 100 is open and the switches 101 and 102 perform no function and hence could have been entirely omitted. It is desirable, however, to provide automatic means effective under normal conditions to shift the transmission 7 from its high to its low gear ratios, or vice versa, in response to variations in the speed ratio of the converter in order to maintain the converter speed ratio within the range of maximum efficiency. Accordingly, there may be provided automatic means responsive to the ratio of speeds between the input shaft of the converter and shaft 45 for energizing solenoid 94 when the transmission is in low gear and the speed ratio of the converter exceeds the ratio B in Figure 6 and for de-energizing the solenoid 94 when the transmission is in high gear ratio and the speed ratio of the converter falls below the ratio A in Figure 6. It is for this reason that the switch contact 102 is connected in series with the switch 100 in line 99, the switch contact 102 being a normally open contact which is closed only when the ratio of speed of the converter input shaft to the shaft 45 reaches or exceeds a value equal to the ratio B times the low speed ratio of the transmission. A suitable means for so automatically operating the contact 102 is fully disclosed in applicant's copending application Serial No. 721,141, filed January 7, 1947, in connection with the corresponding contact 103 of said application, and hence said mechanism need not be set forth further in this application. If desired, the torque converter may be provided with a speed ratio indicating device for guidance of the operator in determining the optimum shifting ratios if the automatic shifting device is not employed.

In addition, in an oil well rotary table drive, it is desirable to employ some means for limiting the maximum torque which may be applied to the rotary table since the application of an excessive torque may result in twisting off the drill stem or other injury. The use of a hydrokinetic torque converter in the drive connections to the table is advantageous in this connection since it constitutes a yielding fluid drive which will not transmit any shock loads. However, in order to obtain a substantial range of torque multiplication valuation within the efficient range of the converter, it is desirable to employ a converter which under stall conditions delivers a relatively high torque multiplication. If the transmission is in low gear, which would normally be the case on starting, and the stall torque multiplication of the converter is relatively high, the total torque deilvered to the rotary table may be excessive. Accordingly, it may be desirable to employ automatic means to insure that the transmission and table drive mechanism are always started with the transmission in its high gear ratio, and further means to insure that the transmission shifts from its low to its high gear ratio when the speed ratio of the converter falls below the ratio A. It is for that reason that the second parallel switch contact 101 is provided in the line 99. The contact 101 corresponds to the contact 104 of applicant's above-mentioned copending application and is operated in the manner described above automatically by the mechanism disclosed in said application. Since this mechanism is fully disclosed and claimed in the aforesaid application, further illustration and description thereof in the present case are believed unnecessary.

It will be apparent that there is provided in accordance with the present invention an exceedingly flexible yet strong and rugged power transmission system for the rotary table of oil well drilling machines. The table speed and torque may be readily adjusted over a relatively wide range by adjustments of the speed of the power source and by control of the speed ratio of the transmission. In addition, if desired the transmission lends itself readily to automatic control in response to the speed ratio of the converter in accordance with the principles of applicant's above-mentioned prior application. The design also permits the use of large heavy-duty clutches for connecting the power take-off shaft to either of the transmission output shafts, and provides the further advantage that these same two clutches may be used to lock the two transmission output shafts together in order to establish the high speed transmission ratio, or be operated to discount the transmission from its load entirely.

While only one form of the invention is shown and described herein, it will be apparent to those skilled in the art that variations in the arrangement and design of the various features may be indulged in without departing from the spirit of the invention or the scope of the appended claim.

Certain features of the mechanism herein disclosed are claimed in applicant's copending application, Serial No. 90,473, filed April 29 1949.

What is claimed is:

A planetary transmission, including a sun gear, a ring gear coaxially mounted but axially displaced with respect to said sun gear, a planet cage coaxially journaled with respect to said gears, a plurality of planet gear clusters journaled on said cage, each cluster including a shaft having a planet gear in mesh with the sun gear and a panet gear of larger diameter than the first planet gear and in mesh with the ring gear, said ring gear and planet cage being journaled on bearings which in their entirety are located inwardly of the axes of the planet gear clusters, said planet cage having a cylindrical outer wall surrounding the planet clusters and located at the side of the large planet gears toward the small planet gears, friction means located in the transverse plane of said cylindrical wall and adapted to co-operate with said wall for holding said planet cage stationary, and friction means located adjacent the transverse plane of the larger planet gears and adapted to co-operate with said ring gear for holding said ring gear stationary.

CHARLES M. O'LEARY.

REFERENCES CITED

The following references are of record in the file of this patent:

UNITED STATES PATENTS

| Number | Name | Date |
|---|---|---|
| 817,908 | Folberth | Apr. 17, 1906 |
| 1,218,493 | Taylor | Mar. 6, 1917 |
| 1,290,473 | Abitz | Jan. 7, 1919 |
| 1,891,598 | Kienzle | Dec. 20, 1932 |
| 2,123,769 | Cotal | July 12, 1938 |
| 2,214,164 | Fawick | Sept. 10, 1940 |
| 2,223,413 | Gasser | Dec. 3, 1940 |
| 2,304,030 | Schmitter | Dec. 1, 1942 |
| 2,304,032 | Schmitter | Dec. 1, 1942 |

FOREIGN PATENTS

| Number | Country | Date |
|---|---|---|
| 138,575 | Great Britain | Feb. 12, 1920 |
| 205,522 | Germany | Jan. 5, 1909 |